United States Patent [19]

Snavely et al.

[11] 4,115,106

[45] Sep. 19, 1978

[54] METHOD FOR PRODUCING METALLIC OXIDE COMPOUNDS

[75] Inventors: Cloyd A. Snavely, Niles, Mich.; John A. Smith, Mishawaka, Ind.

[73] Assignee: National Standard Company, Niles, Mich.

[21] Appl. No.: 734,124

[22] Filed: Oct. 20, 1976

[51] Int. Cl.$^2$ ............................................. C01G 49/08
[52] U.S. Cl. ................................. 75/0.5 AA; 148/105; 252/62.56; 252/62.64; 423/141; 423/151; 423/159
[58] Field of Search ............................ 75/0.5 AA, 114; 148/105; 423/141, 151, 159; 252/62.56, 62.62, 62.55, 62.54, 62.64

[56] References Cited

U.S. PATENT DOCUMENTS

| | | | |
|---|---|---|---|
| 2,735,757 | 2/1956 | Zapf | 75/0.5 AA |
| 3,019,189 | 1/1962 | Albers-Schoenberg | 252/62.56 |
| 3,129,184 | 4/1964 | Kenney et al. | 252/62.56 |
| 3,244,512 | 4/1966 | Gravenor et al. | 75/0.5 AA |
| 3,382,174 | 5/1968 | Hund | 252/62.56 |
| 3,434,797 | 3/1969 | Taylor et al. | 423/141 |
| 3,625,898 | 12/1971 | Driessens | 252/62.56 |
| 3,661,556 | 5/1972 | Jolley et al. | 75/0.5 AA |
| 3,702,270 | 11/1972 | Kawasaki et al. | 75/0.5 AA |
| 3,967,986 | 7/1976 | Rau et al. | 148/105 |
| 4,014,710 | 3/1977 | Woditsch et al. | 252/62.56 |

Primary Examiner—W. Stallard
Attorney, Agent, or Firm—Bacon & Thomas

[57] ABSTRACT

A method for producing metallic oxide compounds having a spinel type structure by reacting the beta form of hydrated iron oxide with a salt of an effective metallic cation.

18 Claims, No Drawings

METHOD FOR PRODUCING METALLIC OXIDE COMPOUNDS

BACKGROUND OF THE INVENTION

1. Field of the Invention

This invention relates generally to the production of metallic oxide compounds having a fine particle size. More particularly, the present invention pertains to the production of metal oxides having a spinel-type structure by simple chemical precipitation and conversion reactions. Specifically, such reactions involve the conversion of mixtures of particulate hydrated oxides of iron with effective metallic solutions under various operating parameters of temperature, time of reaction, concentration of reactants and pH effects. The conversion reactions may also provide for the insertion of desired metal ions into precursor metal oxide crystals to produce crystalline products having compositional and physical characteristics deemed highly desirable and useful in diverse areas of commerce.

2. Description of the Prior Art

The prior art is replete with methods for converting or transforming the various oxides of iron into any of numerous forms. One form of an oxide of iron, magnetite ($Fe_3O_4 = FeO \cdot Fe_2O_3$), is presently produced by prior art processes which are both uneconomical and cumbersome. For example, Frey U.S. Pat. No. 3,036,889 teaches a method for producing the black oxide of iron, or magnetite, having a fine particle size and suitable for pigments, by reducing $Fe_2O_3$ with hydrogen at elevated temperatures according to the following reaction:

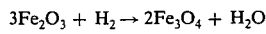
$$3Fe_2O_3 + H_2 \rightarrow 2Fe_3O_4 + H_2O$$

Another known method for making $Fe_3O_4$ involves the simultaneous oxidation and neutralization of a waste pickle liquor solution to precipitate $Fe_3O_4$. Taylor et al U.S. Pat. No. 3,434,797 discloses such a process while utilizing a waste hydrochloric acid pickle liquor containing 20% to 30% by weight of $FeCl_2$. Similarly, Rathmell U.S. Pat. No. 3,261,665 discloses the same basic process while utilizing a waste sulfuric acid pickle liquor containing $FeSO_4$. The type of precipitated $Fe_3O_4$ derived by this basic method may be employed in magnetic inks, in "ferrofluids" for magnetic seals or clutch devices, or any other application where a finely divided magnetic product is required.

The prior art recognizes various methods for producing complex ferrous-metallic compounds which are useful in various, diverse technologies. Along with magnetite, such metal oxide compositions are classified as ferrites. Exemplary of such ferrite formulations are $Zn_xFe_yO_z$ and $Ni_xFe_yO_z$. However, as with known methods for producing magnetite, the prior art procedures for making ferrites are also possessed of undesirable characteristics. For example, a known process for producing ferrites, exemplified by Kenney et al U.S. Pat. No. 3,129,184, discloses ferrites having improved magnetic properties which may be made by mixing iron oxide particles with an oxygen-containing derivative of a divalent metal, such as zinc or nickel carbonate, oxide or hydroxide. The mixture is calcined to drive off carbon dioxide, and to cause a reaction between the iron oxide and the oxide of the divalent metal. The resulting ferrite crystals may be ground to finer sizes and recalcined in order to stabilize their magnetic properties and prepare then for ultimate use in sintered, compact form for applications in the electrical or electronics industry. Large quantities of ferrites produced by this basic process are used where "soft" magnetic properties are required.

Another known procedure for making soft ferrites is exemplified by the Albers-Schoenberg U.S. Pat. No. 3,019,189. This method is based upon the co-precipitation of two or more metal oxide hydrates from salt solutions of the metals. The mixed hydrates are separated from the solution, washed, dried and calcined to obtain ferrite crystals of the desired composition. Co-precipitation is characterized by a very intimate mixing of the raw materials and, thus, ferrite cores prepared from co-precipitated products are believed to be superior in quality to cores made from mixed oxide constituents.

All of the aforementioned prior art methods, and variations thereof, for making magnetite and its related, complex compounds are hereby rendered obsolete by the process of the present invention which is based upon the use of hydrated crystalline iron oxide in one of its lesser known forms, beta FeOOH.

There are four modifications of hydrated iron oxide or oxyhydrates that are presently known. These are alpha, beta, gamma, and delta FeOOH, of which alpha FeOOH is the most widely distributed in nature and which has been more fully studied and documented than the other forms. Upon dehydration, all hydrated iron oxides transform to hematite ($Fe_2O_3$), but this transformation may be different for the various forms, and hematite obtained therefrom may have differences with respect to shape and size of the particles, magnetic properties, morphologic characteristics and color variations.

Of the various forms of hydrated iron oxide, the most exotic is the beta form. Written as beta FeOOH = beta $\frac{1}{2} Fe_2O_3 \cdot H_2O$, this hydrated iron oxide form is thought to be tetragonal with lattice parameters of a = 10.48A and c = 3.023A, and having the structure of hollandite. Sub-units, each $a/3 \times a/3 \times c$, containing two oxygen atoms in an approximately body-centered cubic arrangement, can be distinguished with $Fe^{+++}$ ions lying in octahedral interstices. This form of the oxide is unique in that it appears to be stable only when it contains chloride ions, with a washed precipitate of the beta FeOOH normally containing from two to four percent chlorine.

The beta form of hydrated iron oxide occurs as the mineral "acaganite". This form of the oxide can also be found in small amounts in the corrosion products of some steels. However, the two largest potential sources of beta FeOOH are from the regeneration of spent hydrochloric acid pickle liquor solutions and the regeneration of $FeCl_3$ leaching solutions used in metallurgical separation reactions. Both types of solution can be processed to yield a precipitate of beta FeOOH in the form of needle-like particles.

The normal conversion to the beta form of the hydrated iron oxide takes place in the following oxidation-reduction reaction:

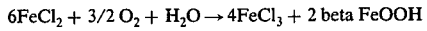
$$6FeCl_2 + 3/2 O_2 + H_2O \rightarrow 4FeCl_3 + 2 \text{ beta FeOOH}$$

Normally, such a process yields pariculate beta FeOOH of a particle size in the range of from about 0.05 to about 0.009 microns. As the input material for the process of the present invention, this particle size range is usually sufficient since the reaction of the present invention will be operable with an input material of FeOOH in this particle size range.

SUMMARY OF THE INVENTION

To obviate the deficiencies in the prior art, it is the primary object of this invention to produce fine metallic oxides, particularly ferrites as exemplified by $Fe_3O_4$, in a simple, yet efficient and highly economical manner.

It is another object of the present invention to produce fine metallic oxides of spinel structure as exemplified by $Fe_3O_4$.

It is yet another object of the present invention to produce a ferrite as exemplified by $Fe_3O_4$ wherein selected and controlled portions of the iron constituent may be substituted by one or more selected metallic species.

It is still a further object of the present invention to produce ferrites of spinel structure by a simple chemical procedure.

It is still further an object of this invention to produce ferrites of spinel structure in a closed chemical system whereby various products may be recycled and employed as reactants in preceding reactions.

Further objects of this invention will become apparent to those skilled in the art from examination of the detailed description of the invention when taken in conjunction with the appended claims.

It has been determined in accordance with this invention that fine metallic oxides, and particularly ferrites of spinel structure, may be simply, efficiently and economically produced in commercial quantities by simple chemical reactions. In brief, iron oxyhydrate of the beta FeOOH structure is produced and subsequently reacted with a salt of an effective metallic cation under controlled temperature and pH to yield a ferrite of spinel structure. Exemplary is the reaction of beta FeOOH with a ferrous salt (e.g. $FeCl_2$) to yield magnetite.

Spinels of ferrite may be produced if the ferrous salt is replaced, in part, by salts of other, selected metallic species generally chosen based upon valence and atomic radii considerations. Accordingly, substituted ferrite spinels may be tailored to yield, for example, a metallic oxide with chromium, nickel and iron constituents in controlled proportions which may be subsequently reduced with hydrogen to yield a stainless steel product. Any number of substitutions are achievable whereby final products may be easily tailored to meet diverse requirements.

DETAILED DESCRIPTION OF THE INVENTION

The economic production in commercial quantities of fine metallic oxides and, particularly, ferrites of the spinel structure, has long been sought. The range of possible ultimate applicability of such products is broad, extending from pigmentation materials for paints, lacquers, inks and the like to metal products and master alloy or doping stock in the production of steels or high alloy iron materials.

The present invention is capable of not only yielding high quality, spinel ferrites in commercial quantity but, additionally, is capable of providing a method whereby a closed chemical system further enhances the economic benefits derived therefrom. The key to the understanding of the present invention is the realization that the little-known form of iron oxyhydrate, beta FeOOH, is capable of undergoing a rapid and complete chemical reaction with certain, effective metallic salts to yield the ferrites of interest.

Little is understood about the subtle distinctions between the four forms of iron oxyhydrate, those being the alpha, beta, gamma and delta structures. However, it has been determined that the beta form, bearing the mineralogical name of "acaganite", is unique among the iron oxyhydrates and appears to be stable only when it contains a small amount of chloride ion; that is, approximately 2 to 4%. While the beta structure does not occur, proportionately, in large volumes in nature as compared with the other, more common structures, and may infrequently be detected in the corrosion products of certain steels, it may be produced by suitable treatment of various industrial wastes.

As indicated, two significant sources of beta FeOOH are spent HCl pickle liquors and the waste attendant with certain ferric chloride metallurgical leaching processes. Alternatively, scrap steel or reduced iron pellets can be leached with $FeCl^3$ solution to yield a low cost $FeCl_2$ solution from which beta FeOOH may be produced. While there are other potential sources of beta FeOOH such as, for example, red mud or other iron-bearing minerals, the foregoing are particularly adaptable to the instant process insofar as the wastes or low cost iron values are capable of direct utilization without intermediate processing steps.

The waste liquors generated during either hydrochloric pickling of iron-bearing materials or the ferric chloride leaching thereof each are predominantly solutions of ferrous chloride, that is, $FeCl_2$, which can be used to produce beta FeOOH. For example, consider a ferric chloride ($FeCl_3$) metallurgical leaching process typically employed in extractive metallurgy which results in a chemical reduction of the $FeCl_3$ to $FeCl_2$. The ferrous chloride waste may be subsequently oxidized as follows:

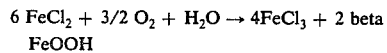

$$6\ FeCl_2 + 3/2\ O_2 + H_2O \rightarrow 4FeCl_3 + 2\ beta\ FeOOH$$

The beta FeOOH is formed as a precipitate of needle-like particles which, upon inspection at high magnification, evidence twinning of the beta crystals to yield a star-like structure upon which further nucleation takes place at preferential crystallographic sites and in preferential crystallographic directions. Upon complete reaction, the beta FeOOH particles approximate a sphere comprised of numerous needle-like projections with particle sizes ranging between approximately 0.009 microns and 0.05 microns. The precipitated particles may be easily separated from the ferric chloride solution which may be recycled for further extractive application. Accordingly, there is developed a closed cycle with respect to the relationship between ferrous chloride, ferric chloride and beta FeOOH. That is, the ferric chloride may be employed in its normal leaching role, which subsequently generates a solution of ferrous chloride, which may then be employed to yield the desired beta FeOOH and simultaneously regenerate ferric chloride solution for future use.

The beta FeOOH is separated and then reacted with an effective metallic salt under controlled temperature and pH conditions to yield the metal oxide of desired formulation. Both the ultimate structure and constituent species of the ferrite may be carefully controlled by reacting selected metallic salts thereby allowing the skilled artisan the flexibility to tailor the final product to suit diverse requirements.

In the simplest case, the beta iron oxyhydrate is reacted with ferrous chloride to yield magnetite. The basic reaction to produce this inverse spinel structure of the ferrite is $$2 \text{ beta FeOOH} + \text{FeCl}_2 + 2\text{OH}^- \rightarrow \text{Fe}_3\text{O}_4 + 2\text{Cl}^- + 2\text{H}_2\text{O}.$$

The reaction is carried out within the temperature range of about 80° F. to about the boiling point of the reaction solution at the reaction pressure utilized. For example, if the reaction is conducted in a pressure vessel, temperatures substantially higher than those corresponding to boiling points at atmospheric pressure can be utilized. A pH of between approximately 4.3 and 14.0 can be utilized to advantage in the practice of the invention. The total ferrous iron concentration in water solutions for the above reaction may vary widely between approximately 7 and 210 grams per liter. Reaction time will vary depending upon the foregoing parameters, but complete conversion may be realized in less than two minutes and generally no longer than 16 minutes. The most preferred operating parameters are a temperature of about 120° F., a pH of about 7.0 and a total ferrous iron concentration of about 80 g/l to yield complete conversion of the beta FeOOH to magnetite in about two minutes. The pH may be controlled by addition of various bases such as ammonium hydroxide, gaseous ammonia, sodium hydroxide, and potassium carbonate; however, it is feasible to employ any base of the Group IA or IIA elements.

While the present invention finds broad utility in the conversion of beta FeOOH to magnetite, it is also possible to produce substituted ferrites of the spinel structure by replacing the ferrous chloride reactant, in part, with other selected metallic salts. The criteria for selection depend predominantly upon the oxidation state of the selected metallic species as well as its relative ionic radius as compared with that of the iron in the ferrite structure. Along these lines, it must be appreciated that magnetite is a mixed oxide structure of FeO . Fe$_2$O$_3$ and, thus, the iron constituent is present in both the +2 and +3 oxidation states. It is generally accepted that eight of the trivalent ions reside in tetrahedral sites within the crystal while the other half of the trivalent ions and the divalent ions are located at octahedral sites. This is known as the inverse spinel structure. Most ferrites are of this form. Accordingly, irons ions may be "tagged" based upon their oxidation states and considered semi-independent for the purposes of chemical substitution. Thus, the ferrous ion may be replaced by other metallic species of compatible oxidation states, independent of any substitution for the ferric ions of the crystal lattice. In order to retain the spinel structure, however, it is obviously apparent that the substituted ionic species should possess an ionic radius consistent with both the radius of the iron species substituted therefor as well as the relative octahedral/tetrahedral site volume as it affects interionic forces within the crystalline lattice over atomic distances.

Accordingly, a portion of the ferrous chloride may be replaced with a metallic chloride salt of the form MCl$_2$ and reacted as:

$$x\text{MCl}_2 + (1-x)\text{FeCl}_2 + 2 \text{ beta FeOOH} + 2\text{OH}^- \rightarrow$$
$$\text{M}_x^{+2}\text{Fe}_{1-x}^{+2}\text{Fe}_2^{+3}\text{O}_4 + 2\text{Cl}^- + 2\text{H}_2\text{O}$$

From the foregoing equation, it is evident that the divalent iron ions have been replaced, in an amount corresponding to $x$, with divalent M ions to yield a substituted ferrite, where $0 \leq X \leq 1$. The metallic ions represented by M may be selected from the group comprising cobalt, magnesium, manganese, nickel and zinc, and added as an appropriate salt of the divalent cation. However, depending upon the desirability of, for example, maintaining a spinel structure as well as individual process needs, other compatible metallic species may also be employed. Along these lines, the skilled artisan will also appreciate that reaction parameters as well as oxide products will vary with the cation selected. Additionally, the substitution of more than one of the foregoing metals may be achieved; that is, the ferrous ion may be replaced, in part, by two or more of the foregoing metallic ions by appropriate reaction with selected salts.

Similarly, the ferric species of iron may be replaced by selected metallic ions in accordance with the following reaction:

$$\text{FeCl}_2 + y\text{NCl}_3 + (2-y) \text{ beta FeOOH} + (2+3y)\text{OH}^- \rightarrow \text{Fe}^{+2}\text{Fe}_{2-y}^{+3}\text{N}_y^{+3}\text{O}_4 + (2+3y)\text{Cl}^- + (2+y)\text{H}_2\text{O},$$

where $0 < y \leq 2$. The metallic species corresponding to N may be selected from the group comprising cobalt, chromium, manganese, nickel and vanadium, and added in the appropriate salt of the trivalent cation. As with the divalent substitution, more than one of the foregoing trivalent ions may be incorporated by suitable reaction with appropriate salts. In both cases of divalent or trivalent substitution chloride salts have been exemplified. However, any effective salt, such as sulfate or acetate, may be employed to yield the ionized cation in solution.

It is also possible to substitute simultaneously for both the ferrous and ferric constituents according to the following reaction:

$$x\text{MCl}_2 + (1-x)\text{FeCl}_2 + y\text{NCl}_3 + (2-y) \text{ beta FeOOH} + (2+3y)\text{OH}^- \rightarrow \text{M}_x^{+2}\text{Fe}_{1-x}^{+2}\text{N}_y^{+3}\text{Fe}_{2-y}^{+3}\text{O}_4 + (2+3y)\text{Cl}^- + (2+y)\text{H}_2\text{O},$$

where $x$ and $y$ have the same range of values given above.

Therefore, a wide range of substitutions is achievable in accordance with the present invention and a very wide range of ultimate products may be realized. The final metallic oxide particles may be varied in color and/or magnetic properties after drying and/or heating depending upon the amount and type of substitution employed to yield pigmentation materials for the paint industry. Similarly, various high alloy and stainless steels may be simply produced by subsequent reduction of the oxides.

Consider, for example, the production of a stainless steel requiring additions of nickel and chromium. If one replaces, in the foregoing double substitution equation, nickel for M and chromium for N, the resultant oxide will be of the form $\text{Ni}_x^{+2}\text{Fe}_{1-x}^{+2}\text{Cr}_y^{+3}\text{Fe}_{2-y}^{+3}\text{O}_4$. In addition, managanese may also be incorporated in the formulation as a second substitutional divalent ion along with nickel. This ferrite may then be reduced by hydrogen to directly yield a stainless steel with the constituents homogeneously distributed throughout the structure thereof. When such a technique is compared with the typical requirements of the steelmaking industry where carefully controlled precautions must be taken to achieve this degree of homogeneity, the beneficial results obtainable by the present invention are obvious.

In order to provide a fuller understanding and appreciation of the objects and advantages of the present invention, the following examples and comparative data will be given, the same being intended as illustrative and in nowise limitative.

COMPARISON BETWEEN ALPHA FeOOH AND BETA FeOOH

As noted above, the present invention may be fully realized only upon reacting the beta form of iron oxyhydrate and that the alpha, gamma and delta structures will not provide the striking benefits obtainable thereby. Reactions according to the data of Examples 1-4 were performed to evaluate the reactivity of the alpha structure.

EXAMPLE 1

| alpha FeOOH | 50 | gm |
| --- | --- | --- |
| $FeSO_4 \cdot 7H_2O$ | 87 | gm |
| NaOH | 26.25 | gm |
| $H_2O$ | 300 | ml |

EXAMPLE 2

| alpha FeOOH | 50 gm | |
| --- | --- | --- |
| $FeSO_4 \cdot 7H_2O$ | 87 gm | |
| NaOH | 21 gm/5.25 gm$^l$ | |
| $H_2O$ | 850 ml | |

EXAMPLE 3

| alpha FeOOH | 50 | gm |
| --- | --- | --- |
| $FeCl_2$ [200 gm/l $Fe^{+2}$] | 80 | ml |
| $NH_4OH$ | 80 | ml |
| $H_2O$ | 140 | ml |

EXAMPLE 4

| alpha FeOOH | 50 | gm |
| --- | --- | --- |
| $FeCl_2$ [200 gm/l $Fe^{+2}$] | 80 | ml |
| $NH_4OH$ | 80 | ml |
| $H_2O$ | 690 | ml |

Examples 1 through 4 illustrate reactions employing the alpha structure of FeOOH with various iron salt reactants, at various concentrations and pH levels, and at a standardized temperature of 193° F. ± 5° F. Each of the reactions of Examples 1 through 4 proceeded very slowly and were virtually indistinguishable with respect to the products obtained. In each case, the reaction observably proceeded for approximately 3 hours, at the end of which time the products were subjected to X-ray diffraction analysis. Additionally, small samples were removed from the beaker of Example 1 at various times and analyzed by X-ray diffraction. The results of the analysis of Example 1 samples are shown in Table 1.

TABLE 1

| Time (min.) | 0 | 15 | 60 | 120 | 180 |
| --- | --- | --- | --- | --- | --- |
| % Conversion from | | | | | |
| alpha FeOOH to $Fe_3O_4$ | 0 | 0 | 50 | 80 | 90 |

Tests performed on Examples 2 through 4 indicated that the reaction proceeded virtually the same as that of Example 1. As can be seen, the reaction is quite slow, with 50% conversion requiring one hour while 90% conversion was achieved only after three hours. Complete conversion of the alpha FeOOH to $Fe_3O_4$ was not achieved.

Example 3 was repeated, but the beta form of iron oxyhydrate was substituted for the alpha form; the concentrations being given in Example 5.

EXAMPLE 5

| beta FeOOH | 53.1 | gm |
| --- | --- | --- |
| $FeCl_2$ [200 gm/l $Fe^{+2}$] | 80 | ml |
| $NH_4OH$ | 80 | ml |
| $H_2O$ | 140 | ml |

The reaction of Example 5 proceeded rapidly to completion. Analysis of the products of reaction after 5 minutes indicated that 100% of the beta FeOOH had been converted to $Fe_3O_4$.

The foregoing data point out the striking difference between conversions involving the alpha structure of iron oxyhydrate in contradistinction to the beta form. Additional tests were performed using the red oxide, $Fe_2O_3$, the results being set forth in Examples 6, 7 and 8.

EXAMPLE 6

| alpha $Fe_2O_3$ | 48 | gm |
| --- | --- | --- |
| $FeCl_2$ [100 gm/l $Fe^{+2}$] | 105 | ml |
| $NH_4OH$ | 80 | ml |
| $H_2O$ | 115 | ml |

EXAMPLE 7

| alpha $Fe_2O_3$ | 48 | gm |
| --- | --- | --- |
| $FeSO_4 \cdot 7H_2O$ | 83 | gm |
| NaOH | 25 | gm |
| $H_2O$ | 300 | ml |

EXAMPLE 8

| alpha $Fe_2O_3$ | 47 gm | |
| --- | --- | --- |
| $FeCl_2$ [165 gm/l $Fe^{+2}$] | 105 ml | |
| $NH_4OH$ | 80 ml + additions to maintain pH 7.5-8.5 | |
| $H_2O$ | 115 ml | |

The reactions of Examples 6 and 8 proceeded approximately the same as those of Examples 1 through 4 insofar as it required approximately three hours to convert the alpha $Fe_2O_3$ to $Fe_3O_4$. However, Example 7 proceeded much slower and yielded less than 50% conversion after two hours.

Recognizing that the objects and advantages of the present invention can be realized only by employing the beta structure of FeOOH, the following examples are provided to contrast temperature, concentration, pH and particle size effects in order to provide a broad overview of the wide range of operating parameters available to one ordinarily skilled in the art in practicing the present invention.

TEMPERATURE EFFECTS

Examples 9 through 11 are indicative of reactions involving the beta form of iron oxyhydrate conducted at various temperatures. Table 2 summarizes these data.

EXAMPLE 9

| beta FeOOH | 27.5 | gm |
|---|---|---|
| $Fe^{++}$ as $FeCl_2$ | 8.8 | gm |
| $H_2O$ | up to 300 | ml |
| $NH_4OH$ | 22 | ml |
| Time | 2 | min. |
| pH | 8.3 | |
| Temp | 77–83° | F |

EXAMPLE 10

| beta FeOOH | 27.4 | gm |
|---|---|---|
| $Fe^{++}$ as $FeCl_2$ | 8.8 | gm |
| $H_2O$ | up to 300 | ml |
| $NH_4OH$ | 60 | ml |
| Time | 15 | min. |
| pH | 7.2 | |
| Temp | 206–214° | F |

EXAMPLE 11

| beta FeOOH | 27.4 | gm |
|---|---|---|
| $Fe^{++}$ as $FeCl_2$ | 8.8 | gm |
| $H_2O$ | up to 300 | ml |
| $NH_4OH$ | 45 | ml |
| Time | 15 | min. |
| pH | 8.0 | |
| Temp | 170° | F |

TABLE 2

| Example | % Conversion of beta FeOOH to $Fe_3O_4$ |
|---|---|
| 9 | 95 |
| 10 | 99 |
| 11 | 100 |

It can be seen from Examples 9 through 11 that temperature may be varied widely over the range of approximately 75 to 210° F. without substantial effects upon the conversion to $Fe_3O_4$. Examples 10 and 11 show substantially total conversion of the beta FeOOH to $Fe_3O_4$ after 15 minutes, with particle sizes of the final product corresponding to a surface area of approximately 15 m²/gm (BET).

The product of Example 9 was analyzed after two minutes in an effort to gain some insight into the mechanics of the reaction. As shown, 95% conversion had been achieved at that point and the final particle size was somewhat smaller, corresponding to a surface area of 21 m²/gm(BET), which tends to strongly indicate a nucleation and growth mechanism; however, we do not wish to be bound by any particular theory to explain this phenomenon.

CONCENTRATION EFFECTS

To determine what, if any relationship exists between initial iron ion concentration and final product yields, Examples 12 through 14 were performed as follows:

EXAMPLE 12

| beta FeOOH | 2.8 | gm |
|---|---|---|
| $Fe^{++}$ as $FeCl_2$ | .9 | gm |
| $H_2O$ | up to 300 | ml |
| $NH_4OH$ | 4.5 | ml |
| Temp | 187–195° | F |
| Time | 15 | min. |
| pH | 7.3 | |

EXAMPLE 13

| beta FeOOH | 110 | gm |
|---|---|---|
| $Fe^{++}$ as $FeCl_2$ | 35 | gm |
| $H_2O$ | up to 300 | gm |
| $NH_4OH$ | 180 | ml |
| Temp | 187–204° | F |
| Time | 15 | min. |
| pH | 7.6 | |

EXAMPLE 14

| beta FeOOH | 36.5 | gm |
|---|---|---|
| $Fe^{++}$ as $FeCl_2$ | 11.7 | gm |
| $H_2O$ | up to 410 | ml |
| $NH_4OH$ | 60 | ml |
| Temp | 189–197° | F |
| Time | 15 | min. |
| pH | 8.2 | |

TABLE 3

| Example | % Conversion of beta FeOOH to $Fe_3O_4$ | Surface Area (m²/gm) |
|---|---|---|
| 12 | 100 | 15 |
| 13 | 100 | 22 |
| 14 | 100 | 15 |

As can be seen, 100% conversion was realized independent of the iron ion concentration supplied from both the iron oxyhydrate and ferrous chloride reactants. However, a size effect is manifest, it being believed the same competitive forces regarding nucleation and growth are present with the strongest iron ion concentration yielding the smallest final particle size.

pH EFFECTS

A response of conversion to varying pH levels is examined in Examples 15 through 17, with the results summarized in Table 4.

EXAMPLE 15

| beta FeOOH | 27.4 | gm |
|---|---|---|
| $Fe^{++}$ as $FeCl_2$ | 8.8 | gm |
| $H_2O$ | up to 300 | ml |
| $NH_4OH$ | 30 | ml |
| Temp | 191–194° | F |
| Time | 15 | min. |
| pH | 6.6 | |

EXAMPLE 16

| beta FeOOH | 27.4 | gm |
|---|---|---|
| $Fe^{++}$ as $FeCl_2$ | 8.8 | gm |
| $H_2O$ | up to 300 | ml |
| $NH_4OH$ | 15 | ml |
| Temp | 191–194° | F |
| Time | 15 | min. |
| pH | 4.3 | |

EXAMPLE 17

| beta FeOOH | 27.4 | gm |
|---|---|---|
| Fe$^{++}$ as FeCl$_2$ | 8.8 | gm |
| H$_2$O | up to 300 | ml |
| NaOH | 25 | ml |
| Temp | 202–212° | F |
| Time | 15 | min. |
| pH | 13 | |

TABLE 4

| Example | % Conversion of beta FeOOH to Fe$_3$O$_4$ | Surface Area (m$^2$/gm) |
|---|---|---|
| 15 | 100 | 14 |
| 16 | 50 | 30 |
| 17 | 100 | 14 |

Examples 15 and 17 indicate complete conversion to Fe$_3$O$_4$ and show an independence of particle size on pH adjustment over the approximate range of 6 to 13. However, Example 16 reflects a diminished rate of conversion with relatively small particle size.

HYDRATE SIZE EFFECTS

A comparison of apparent particle size of the beta FeOOH reactant on the apparent particle size of the Fe$_3$O$_4$ product is presented in Examples 18 through 20 and summarized in Table 5.

EXAMPLE 18

| beta FeOOH [27 m$^2$/gm] | 27.4 | gm |
|---|---|---|
| Fe$^{++}$ as FeCl$_2$ | 8.8 | gm |
| H$_2$O | up to 300 | ml |
| NH$_4$OH | 45 | ml |
| Temp | 186–197° | F |
| Time | 15 | min. |
| pH | 7.8 | |

EXAMPLE 19

| beta FeOOH [39 m$^2$/gm] | 27.4 | gm |
|---|---|---|
| Fe$^{++}$ as FeCl$_2$ | 8.8 | gm |
| H$_2$O | up to 300 | ml |
| NH$_4$OH | 45 | ml |
| Temp | 189–197° | F |
| Time | 15 | min. |
| pH | 7.3 | |

EXAMPLE 20

| beta FeOOH [90 m$^2$/gm] | 27.4 | gm |
|---|---|---|
| Fe$^{++}$ as FeCl$_2$ | 8.8 | gm |
| H$_2$O | up to 300 | ml |
| NH$_4$OH | 45 | ml |
| Temp | 190–195° | F |
| Time | 15 | min. |
| pH | 7.3 | |

TABLE 5

| Example | % Conversion of beta FeOOH to Fe$_3$O$_4$ | Surface Area (m$^2$/gm) |
|---|---|---|
| 18 | 100 | 7.6 |
| 19 | 100 | 12 |
| 20 | 100 | 14 |

There appears to be a direct relationship between the surface area of the iron oxyhydrate reactant and the particle size of the subsequent Fe$_3$O$_4$ product. As the reactant surface area decreases, so does that of the product; however, the distinction becomes less significant as the hydrate surface area decreases. That is, comparing Examples 19 and 20, as the hydrate particles surface area decreases approximately two and one-half times, the final oxide particles decrease in surface area less than approximately 20%. Accordingly, it would appear that the ultimate particle size is more strongly a function of growth than nucleation with the smaller particles of hydrate merely presenting more numerous nuclei and is relatively ineffective in influencing the ultimate growth process.

DIVALENT SUBSTITUTION

Similar tests were conducted with respect to the substitution of divalent metallic ions for a portion of the ferrous constituent of the ferrite spinel. Example 21 shows the various concentration of these components in a zinc substitution reaction.

EXAMPLE 21

| beta FeOOH | 41.5 | gm |
|---|---|---|
| Zn$^{++}$ as ZnCl$_2$ | 19.4 | gm |
| Fe$^{++}$ as FeCl$_2$ | 3.24 | gm |
| H$_2$O | 800 | ml |
| NH$_4$OH | 150 | ml |
| Temp | 193 ± 5° | F |
| Time | 3 | min. |
| pH | 8.0 – 8.5 | |

The reaction was observed to subside after three minutes at which time X-ray diffraction analysis showed a 95% conversion of the beta FeOOH. The crystal lattice was strained from the normal Fe$_3$O$_4$ configuration indicating the presence of the zinc component. In other experiments the presence of zinc in the product crystals was confirmed by chemical analysis.

DOUBLE SUBSTITUTION

Example 22 illustrates a double substitution of both divalent and trivalent ions for the ferrous and ferric constituents of the ferrite, respectively.

EXAMPLE 22

| beta FeOOH | 39.2 | gm |
|---|---|---|
| Fe$^{++}$ as FeCl$_2$ | 13.0 | gm |
| Cr$^{+++}$ as CrCl$_3$ | 9.0 | gm |
| Ni$^{++}$ as NiCl$_2$ | 4.0 | gm |
| NaOH | 43.0 | gm (added over 30 min) |
| H$_2$O | 800 | ml |
| Temp | 193 ± 5° | F |
| Time | 3 | hours |
| pH | 8–8.5 | |

The reaction was allowed to continue for three hours in order to provide sufficient time for complete equilibration between competing reactions. At that time, an X-ray diffraction analysis was performed which indicated a reaction product of the general form M$_3$O$_4$ with approximately 2% beta FeOOH present. Subsequent atomic absorption spectrochemical analysis indicated the final metallic oxide to be constituted of 7.99% nickel, 15.7% chromium and 76.31% iron.

In conducting other tests upon the beta iron oxyhydrate, it has been determined that numerous metallic species may be substituted to provide oxides incorporating various amounts and types of selected metallic ions. From this experimentation it has been determined that the relative amount and variety of species may be altered within wide ranges, provided however, that approximately 20% of the divalent ion reactant is in the form of iron. While lesser amounts provide satisfactory results, the reaction proceeded rather slowly, and can be tolerated only at the expense of time; however, for some application, the beneficial results will offset such considerations.

ALTERNATE EMBODIMENTS

The foregoing examples illustrate the efficacy of the present invention utilizing, primarily, chloride salts of various metallic species. However, the features of the invention extend far beyond these reactants, it having been determined that other inorganic salts, as well as organic salts, are similarly operative within the scope of utility of the invention. Examples 23 and 24 are given as exemplary of this advantage.

EXAMPLE 23

| | | |
|---|---|---|
| beta FeOOH | 27.4 | gm |
| $Fe^{++}$ as $FeSO_4$ | 8.8 | gm |
| $H_2O$ | up to 300 | ml |
| $NH_4OH$(28.5–30%$NH_3$) | 45 | ml |
| Temp | 186–194° | F |
| Time | 15 | min. |
| pH (Final) | 7.6 | |

X-ray analysis of the product of Example 23 confirmed 100% conversion to $Fe_3O_4$ and it was determined that the product particles possessed an average surface area of about 23.2 $m^2$/gm.

EXAMPLE 24

| | | |
|---|---|---|
| beta FeOOH | 27.4 | gm |
| $Fe^{++}$ as $Fe(CH_3COO)_2$ | 8.8 | gm |
| $H_2O$ | up to 300 | ml |
| $NH_4OH$ | 40 | ml |
| Temp | 180–195° | F |
| Time | 15 | min. |
| pH | 8.4 | |

Visual observation of the reaction of Example 24 indicated an almost instantaneous conversion as evidenced by a color change of the solution to black accompanied by magnetic susceptibility. X-ray diffraction analysis confirmed 100% conversion to $Fe_3O_4$ and it was ascertained that the product had a surface area of about 47 $m^2$/gm (BET). Accordingly, ferrous acetate is a highly preferred reactant. Yet other organic salts are believed to be effective in the conversion to magnetite and, thus, the recitation of only ferrous acetate is not meant to be exclusive, but representative of this aspect.

Similarly, various bases other than ammonium hydroxide are useful in the conversion process. As noted above, gaseous ammonia, sodium hydroxide, and potassium carbonate represent but a few of the useful bases envisioned within the scope of the present invention. Example 25 is given as illustrative.

EXAMPLE 25

| | | |
|---|---|---|
| beta FeOOH | 27.4 | gm |
| $Fe^{++}$ as $FeCl_2$ | 8.8 | gm |
| $H_2O$ | up to 300 | ml |
| $K_2CO_3$(530 gm/l) | 60 | ml |
| Temp | 178–198° | F |
| Time | 15 | min. |
| pH | 8.1 | |

X-ray analysis of the product of Example 25 confirmed 100% conversion to $Fe_3O_4$; average particle surface area was determined to be about 18.4 $m^2$/gm.

While the invention has been described and illustrated with reference to certain preferred operating parameters, those skilled in the art will appreciate that various modifications, changes, additions, omissions and substitutions may be made without departing from the spirit of the invention. It is intended, therefore, that the invention be limited only by the scope of the following claims.

What is claimed is:

1. A method for producing fine metallic oxides of spinel-type structure comprising the step of reacting beta FeOOH with an aqueous solution of a salt of a substitution-effective metallic cation to yield a ferrite product exhibiting a spinel crystal habitat, wherein the conversion of the beta FeOOH to the ferrite product is substantially complete within less than approximately 40 minutes.

2. The method of claim 1, wherein said cation is divalent iron.

3. The method of claim 2, wherein the salt is selected from the group consisting of chlorides, sulfates, and acetates of divalent iron.

4. The method of claim 3, wherein said salt is $FeCl_2$.

5. The method of claim 1, wherein the reaction is conducted within the temperature range of from about 75° F. to about 210° F.

6. The method of claim 5, wherein said reaction is conducted within a pH range of from about 4.3 to about 14.

7. The method of claim 3, wherein the total iron concentration is within the range of from about 7 gm/l to about 210 g/l.

8. A method for producing fine metallic oxides of spinel-type structure and having the form $$M_x^{+2}Fe_{1-x}^{+2}N_y^{+3}Fe_{2-y}^{+3}O_4$$

comprising the step of reacting beta FeOOH with an aqueous solution of salts of metallic cations M and N, wherein:
M is a divalent cation selected from the group consisting of Co, Mg, Mn, Ni, Nz and mixtures thereof;
N is a trivalent cation selected from the group consisting of Co, Cr, Mn, Ni, V and mixtures thereof; and
the sum of $x + y < 0$;
to yield a fine metallic oxide having a spinel-type structure, wherein the conversion of the beta FeOOH to the oxide is substantially complete within less than approximately 40 minutes.

9. The method of claim 8, wherein said aqueous solution of salts includes a salt of divalent iron in addition to said cations M and N.

10. The method of claim 9, wherein said salts are selected from the group consisting of chlorides, sulfates and acetates and mixtures thereof of said metallic cations.

11. The method of claim 9, wherein M is selected from the group consisting of Co, Mn, Ni, Zn and mixtures thereof; and N is Cr.

12. The method for producing a fine metallic oxide of spinel-type structure and having the form $$M_x^{+2}Fe_{1-x}^{+2}N_y^{+3}Fe_{2-y}^{+3}O_4$$

comprising the steps of:

(a) treating iron-bearing materials with $FeCl_3$ whereby $FeCl_2$ is produced as a by-product;
(b) oxidizing said $FeCl_2$ to yield particles of beta FeOOH and regenerate $FeCl_3$;
(c) reacting said beta FeOOH with an aqueous solution comprising salts of effective metallic cations M and N and divalent iron to yield said oxide, wherein the conversion of the beta FeOOH to the oxide is substantially complete within less than approximately forty minutes; and
(d) recycling the $FeCl_3$ of step (b) to step (a); wherein:
M is a divalent cation selected from the group of Co, Mg, Mn, Ni, Zn and mixtures thereof;
N is a trivalent cation selected from the group consisting of Co, Cr, Mn, Ni, V and mixtures thereof; and
the sum of $x + y > 0$.

13. The method of claim 12, wherein M is selected from the group consisting of Co, Mn, Ni, Zn and mixtures thereof; and N is Cr.

14. The method of claim 13, wherein said salts are selected from the group consisting of chlorides, sulfates, and acetates and mixtures thereof of M, N and divalent iron.

15. The method for producing a ferrous alloy comprising the step of reducing the oxide produced by the method of claim 14.

16. The homogeneous, non-hydrated fine oxide product of claim 13.

17. The ferrous alloy of claim 15, wherein the constituents M, N and Fe are homogenously dispersed.

18. The non-hydrated, fine oxide produced by claim 1.

* * * * *

UNITED STATES PATENT OFFICE
CERTIFICATE OF CORRECTION

Patent No. 4,115,106          Dated September 19, 1978

Inventor(s) CLOYD A. SNAVELY et al

It is certified that error appears in the above-identified patent and that said Letters Patent are hereby corrected as shown below:

In column 2, line 65, change "pariculate" to --particulate--;

In column 4, line 20, change "$FeCl^3$" to --$FeCl_3$--;

In column 5, line 50, change "irons" to --iron--;

In column 6, line 44, change "$Fe_{2-4}{}^{+3}O_4$" to --$Fe_{2-y}{}^{+3}O_4$--;

line 62, change "managanese" to --manganese--; and

In column 14, line 45, change "Nz" to --Zn--.

Signed and Sealed this

Twenty-seventh Day of February 1979

[SEAL]

Attest:

RUTH C. MASON
Attesting Officer

DONALD W. BANNER
Commissioner of Patents and Trademarks